Nov. 4, 1924. 1,514,333
A. H. OOMS
METHOD OF TRANSPORTING CLAY PIPES FROM THEIR MOLDING
PRESSES TO THE DRYING ROOM
Filed May 2, 1924
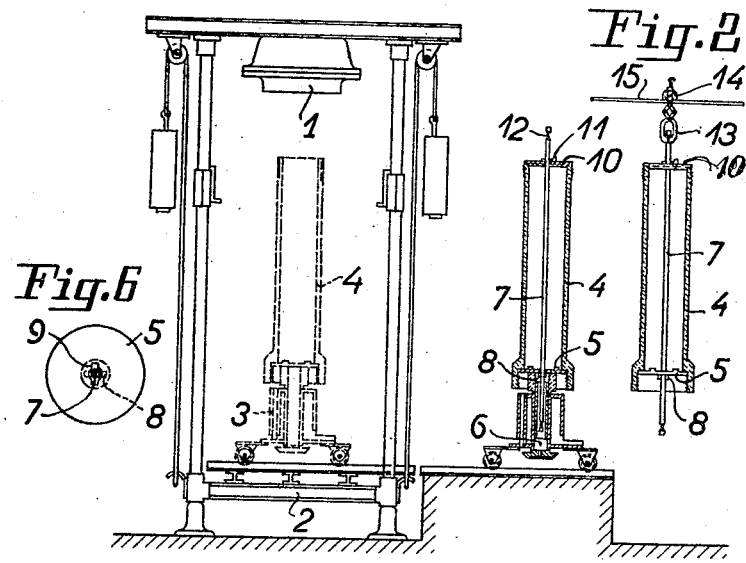
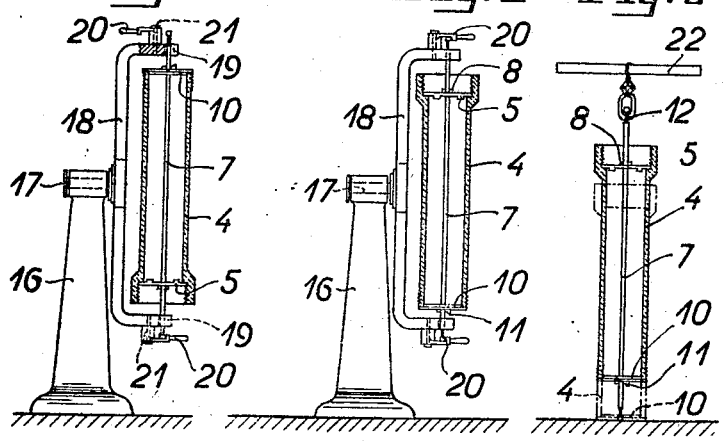
WITNESSES
INVENTOR Patented Nov. 4, 1924.

1,514,333

UNITED STATES PATENT OFFICE.

ANTON HEINRICH OOMS, OF FRECHEN, NEAR COLOGNE, GERMANY.

METHOD OF TRANSPORTING CLAY PIPES FROM THEIR MOLDING PRESSES TO THE DRYING ROOM.

Application filed May 2, 1924. Serial No. 710,690.

*To all whom it may concern:*

Be it known that I, ANTON HEINRICH OOMS, a citizen of Germany, residing at Frechen, near Cologne, county of Rhenish Prussia and State of Prussia, Germany, have invented certain new and useful Improvements in Methods of Transporting Clay Pipes from Their Molding Presses to the Drying Room, of which the following is a specification.

This invention relates to improvements in the transport of clay pipes moulded in vertically operating presses from the latter to the drying room, and it has for its object to provide a method according to which the transport of the clay pipes, which are still moist, is effected with the axes of the pipes in a vertical position which they assumed during the molding, and without it being necessary to touch the moist pipe bodies by the hands or otherwise either during their removal from the press, or during the actual transport or while depositing them at the desired place.

Another object of the invention is to render the transporting and depositing of the clay pipes simple and easy so as to reduce the time and expenses entailed by the respective methods in use hitherto.

In comparison with the well-known methods, the present method possesses the advantage that there does no longer exist any danger of deforming or otherwise injuring the clay pipes which are only little resistible in the moist condition, thus securing the manufacture of clay pipes which remain smooth both on the inside and outside and therefore are of an increased value.

The method will now be described in detail with reference to the accompanying drawing in which:

Fig. 1 is a side elevation of the lower portion of a clay pipe molding press.

Fig. 2 is a side elevation, partly in section, of a pipe suspended to a carrying rod which is used in the transport of the pipe, Fig. 3 is a side elevation, partly in section, of a turning device showing a pipe held in it with its socket end down, Fig. 4 is an elevation, similar to Fig. 3, showing the pipe in a position with its socket end up, Fig. 5 is a view illustrating the transport of the pipe and the depositing of it on the floor of the drying room, Fig. 6 is a bottom plan of the socket supporting plate and its releasable connection with the carrying rod.

Arranged underneath the pressing cylinder 1 is the pipe supporting platen 2 which is adapted to receive a vertical reciprocatory movement in the ordinary manner and which carries the supporting plate 5 designed to form the surface of the inner hollow of the socket of the pipe 4 and to support the latter during the molding. The plate 5 is preferably carried by a carriage 3 travelling on suitable tracks, and it is mounted on a vertical rotatable spindle 6 which is hollow for the purposes of the invention.

Upon the molding operation being terminated the platen 2 is lowered and the carriage moved outwards from underneath the press with the moulded pipe in vertical position. The upper end of the pipe being thus made accessible, an iron carrying rod 7 is introduced through the interior of the pipe 4 and a central hole of the supporting plate 5. The rod 7 is provided with means for releasably connecting it with the socket supporting plate 5 at a certain distance from its lower end. To this end, the rod may, for instance, be provided with a transverse key 8 projecting beyond the rod at opposite points and adapted to be passed through a slot-like enlargement 9 of the central hole of plate 5 and brought into a position to support the plate 5 by imparting to the rod 7 a certain rotation.

After the carrying rod 7 has been inserted as described, a holding or supporting plate 10 having a central hole and a cylindrical projection adapted to fit into the socketless end of the pipe 4 is passed over the rod 7 and placed on the said pipe end coaxially with the pipe. The plate 10 is held in this position by any suitable means, such as for example by a split-pin 11 inserted through a hole of the rod 7 on the outside of the plate 10. The carrying rod is provided near its ends with restricted portions 12 at which the rod may be easily gripped by conveying tongs 13. As shown in Fig. 2, the tongs may be connected with a travelling crab 14 or suspended from such crab. The crab serves to transport the pipe along an overhead track or carrying rope 15. The pipe is then fed to a turning device which may consist of a standard 16 in which a holding fork 18 is mounted for rotation by means of a pin 17. The shank ends of the fork which are bent to extend horizontally in the same direction and parallelly to each other are provided with slots 19 lying in a common plane and designed to receive the rod carrying the pipe. For releasably connecting the carrying rod with the fork and securely holding the pipes during the turning operation, different means may be used such as for instance suitably shaped levers 20 which are mounted for swinging motion on pins 21 and adapted to be swung round and placed laterally before the rod 7 so as to lock the latter in the slots 19. The carrying rod and its pipe having thus been securely connected with the turning device, the fork 18 is rotated on the pin 17 for 180 degrees so as to cause the pipe to be turned upside down and have its socket disposed on high. In this position the pipe is transported to the drying room for instance by means of a hand carrying bar 22 which is provided with tongs 13 for holding the rod 7 with its pipe. For depositing the work, the rod 7 is first put down on the floor. The split-pin 11 is then removed and the pipe resting on the plate 10 allowed to glide down along the carrying rod 7. During this gliding motion the plate 10 is supported by hand or by means of a suitably constructed supporting device which allows the pipe to glide down slowly.

If the vertically reciprocating platen 2 is not provided with an outwardly movable carriage for supporting the plate 5, the spindle of the press is preferably formed with a central longitudinal bore too through which the carrying rod 7 may be passed for introducing it into the interior of the pipe.

Having thus described my invention, what I claim as new and desire to secure by Letters Patent, is:—

The method of transporting clay pipes from vertically operating clay pipe molding presses to the drying room which consists in passing a carrying rod axially through the pipe and a supporting plate upon which the pipe is seated by its socket-end, releasably connecting the carrying rod with the said plate, passing another supporting plate over the carrying rod so as to be placed on the socketless end of the pipe and releasably connecting the last-mentioned plate with the carrying rod, conveying the pipe thus suspended in vertical position from the carrying rod to a turning device, turning the pipe upside down by means of that turning device and thereupon transporting it in vertical position by means of the carrying rod to the drying room where the carrying rod is put down by its lower end on the floor, the secondly mentioned supporting plate disengaged from the rod and the pipe allowed to glide down along the rod and to be deposited on the floor with the said supporting plate at its socketless end.

In testimony whereof I have affixed my signature.

ANTON HEINRICH OOMS.